United States Patent
Noemer et al.

[15] 3,661,458
[45] May 9, 1972

[54] PHOTOGRAPHIC COPYING APPARATUS

[72] Inventors: Ewald Fred Noemer, Dumont, N.J.; Franz J. Kau, Spring Valley; Heinz Lüdemann, Pearl River, both of N.Y.

[73] Assignee: Agfa-Gevaert Aktiengesellschaft, Leverkusen, Germany

[22] Filed: June 25, 1970

[21] Appl. No.: 49,843

[30] Foreign Application Priority Data

June 28, 1969 Germany......................G 69 30 562.0

[52] U.S. Cl...................................355/88, 350/315, 355/36
[51] Int. Cl. .......................................................G03b 27/04
[58] Field of Search......................355/32, 35, 36, 88, 83, 71; 95/53, 58; 350/315, 316

[56] References Cited

UNITED STATES PATENTS 3,468,228    9/1969    Rogers................................355/88 X

*Primary Examiner*—Samuel S. Matthews
*Assistant Examiner*—Richard L. Mose
*Attorney*—Michael S. Striker

[57] ABSTRACT

A photographic copying apparatus wherein the shutter blade is moved to open position by the frames of color filters whenever a filter pivots in a direction to move out of registry with the light-admitting opening. The filters are pivoted by rotary electromagnets which are deenergized when the respective filters extend across the path of incoming light. The shutter blade is biased to closed position and is pivotable about the common axis of the filters.

10 Claims, 1 Drawing Figure

PATENTED MAY 9 1972 3,661,458
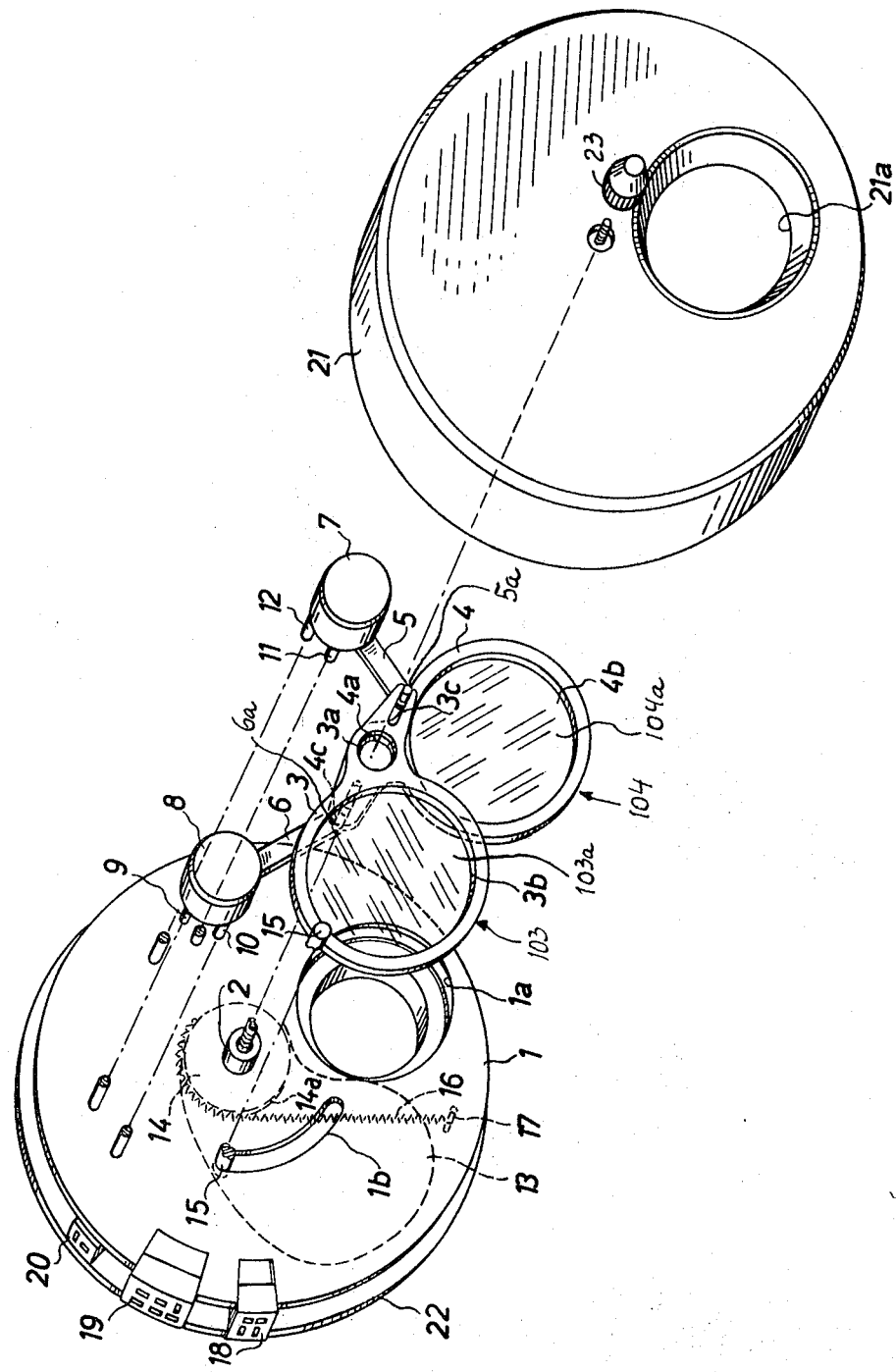
INVENTOR
FRANZ J. KAU
FRED NOEMER
HEINZ LÜDEMANN
BY EWALD

PHOTOGRAPHIC COPYING APPARATUS

BACKGROUND OF THE INVENTION

The present invention relates to photographic apparatus in general, and more particularly to improvements in photographic copying apparatus. Still more particularly, the invention relates to improvements in photographic copying apparatus of the type wherein carriers of photosensitive material are exposed to light which passes through one or more color filters, especially through color filters which are movable into and out of the path of printing light by electromagnets.

Presently known photographic copying apparatus comprise two or more color filters each of which is movable by a discrete electromagnet, as well as a shutter whose blade or blades are movable between open and closed positions by a further electromagnet. The electromagnet for the shutter is in series with several switches, one for each color filter. Each switch is caused to close in response to movement of the corresponding filter into the path of printing light. Thus, the electromagnet for the shutter blades can be energized to close the blades only when all of the filters are moved into the path of printing light.

A drawback of the just described copying apparatus is that they must employ a rather complicated and expensive electric circuit with a substantial number of switches and a separate electromagnet for the shutter blade or blades.

SUMMARY OF THE INVENTION

An object of the invention is to provide a photographic apparatus, particularly a photographic copying apparatus for the reproduction of color images on photosensitive material, which is simpler, less expensive and more compact than presently known copying apparatus.

Another object of the invention is to provide a copying apparatus wherein the number of electromagnets need not exceed the number of filters.

A further object of the invention is to provide a copying apparatus wherein the shutter blade or blades are movable in a novel and improved way.

An additional object of the invention is to provide a novel assembly of a shutter and color filters which can be installed in presently known photographic copying apparatus.

Still another object of the invention is to provide a novel shutter for use in a photographic copying apparatus.

The invention is embodied in a photographic apparatus, particularly in a photographic copying apparatus wherein photosensitive material is exposed to printing light passing through a plurality of color filters, which comprises a shutter defining a light-admitting opening and including blade means normally assuming a closed position and being movable to an open position to thereby permit light to pass through the opening, a plurality of filters each movable between first and second positions in which the corresponding filter respectively registers with and is out of registry with the opening, drive means (preferably including a plurality of discrete rotary electromagnets) for moving the filters between first and second positions, and displacing means for moving the blade means to open position in response to movement of at least one filter to second position.

The displacing means preferably comprises a projection or an analogous motion receiving portion provided on the blade means and a motion transmitting portion provided on each of the filters and arranged to move the blade means to open position by way of the motion receiving portion in response to movement of the corresponding filter to its second position. Each filter may comprise a light-transmitting element and a frame or holder for the light-transmitting element whereby a portion of each holder constitutes the corresponding motion transmitting portion.

The novel features which are considered as characteristic of the invention are set forth in particular in the appended claims. The improved photographic copying apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is an exploded perspective view of a portion of a photographic copying apparatus which embodies the invention.

DESCRIPTION OF THE PREFERRED EMBODIMENTS

The photographic copying apparatus of our invention comprises a shutter having a circular plate-like support 1 provided with an eccentric light-admitting opening 1a. A centrally located shaft 2 defines a fixed pivot axis for a shutter blade 13 which is mounted behind the support 1 and is movable between a closed position in which it overlies the opening 1a and the illustrated open position in which it is out of registry with the opening. The means for permanently biasing the blade 13 to its closed position comprises a disk 14 which is fixed to the blade and has a peripheral surface provided with a circumferential groove 14a for the convolutions of a helical spring 16. One end of the spring 16 is secured to a post 17 which is fixed to the support 1 and the other end of this spring is secured to the disk 14. In the illustrated open position of the shutter blade 13, the spring 16 stores energy and tends to pivot the blade in a counterclockwise direction. The convolutions of the spring 16 are closely adjacent to each other and the manner in which the spring 16 and the disk 14 cooperate is not unlike that between a pulley and a cord.

The shaft 2 further serves as a pivot for two filters 103, 104 which are disposed in parallel planes in front of the support 1. The filter 103 is located in front of the filter 104. These filters respectively comprise disk-shaped light-transmitting elements 103a, 104a which are respectively mounted in circular apertures 3b, 4b provided in two ring-shaped frames or holders 3, 4. These holders are respectively provided with registering circular bores or holes 3a, 4a for the shaft 2. The light-transmitting elements 103a, 104a are retained in the holders 3, 4 by means of split rings or like retaining means, not shown. The elements 103a, 104a preferably constitute additive color filters, for example, in the colors blue and yellow. The holders 3, 4 are further respectively formed with slots 3c, 4c for pins 5a, 6a which are respectively provided on the armatures 5, 6 of two rotary electromagnets 7, 8. The electromagnets 8 and 7 are respectively secured to the support 1 by means of pins 9, 10 and 11, 12 or analogous fasteners. These electromagnets constitute a pair of discrete drive means, one for each of the filters 103, 104, and they comprise customary springs (not shown) which hold the armatures 5, 6 in such positions that the corresponding light-transmitting elements 103a, 104a overlie the opening 1a when the associated electromagnet is deenergized. Energization of the electromagnets 7, 8 causes the corresponding filters 103, 104 to move from their first positions in which they overlie the opening 1a to their second positions in which the corresponding light-transmitting elements 103a, 104a are out of registry with the light-admitting opening.

The displacing means for moving the shutter blade 13 to open position in response to pivotal movement of the filter 103 and/or 104 to second position comprises a motion receiving projection or pin 15 which is fixed to the blade 13 and extends forwardly through an arcuate slot 1b in the support 1. The holders 3, 4 constitute the motion transmitting portions of the respective filters and serve to pivot the blade 13 to the illustrated open position in response to pivotal movement of at least one of the filters 103, 104 to its second position. The center of curvature of the slot 1b is located on the axis of the shaft 2. It will be noted that the pin 15 extends sufficiently beyond the front side of the support 1 to be located in the path of both holders (3 and 4) so as to make sure that the shutter blade 13 pivots in response to pivoting of the filter 103 and/or 104 to second position. The pin 15 is preferably surrounded by a sleeve of elastic material to soften the impact when struck by the holder 3 or 4 in response to energization of the electromagnet 7 or 8.

The marginal portion of the support 1 carries several sockets 18, 19, 20 two of which serve to connect the electromagnets 7, 8 with an energy source. The sockets 18–20 are disposed between the rear side of the support 1 and a disk-shaped cover 22 forming part of a flat housing which further includes a cupped body 21 defining a compartment for the electromagnets 7, 8 and filters 103, 104. The blade 13 is located between the support 1 and cover 22. A nut 23 is employed to mate with the threaded front end portion of the shaft 2 in order to releasably hold the cupped body 21 in operative position. The housing including the body 21 and cover 22 can be installed as a unit in many presently known photographic color printing or copying apparatus. The body 21 has an aperture 21a in registry with the opening 1a. A similar aperture is provided in the cover 22. The electromagnets 7, 8 are installed in a control circuit of known design which determines the timing and duration of energization and hence the intervals during which the light-transmitting elements 103a, 104a are located in the path of printing light.

The operation:

When the copying apparatus is not in use, the electromagnets 7, 8 are deenergized and the springs of these electromagnets cause the filters 103, 104 to maintain their respective light-transmitting elements 103a, 104a in the path for the printing light, i.e., in registry with the aperture 21a and opening 1a. Therefore, the spring 16 is free to contract and holds the shutter blade 13 in the closed position (in registry with the opening 1a) whereby the motion receiving pin 15 extends into the lower end portion of the arcuate slot 1b.

If the control circuit produces a signal which causes energization of the electromagnet 7, the armature 5 pivots the filter 103 in a clockwise direction to its second position whereby the holder 3 engages the pin 15 and moves it into the upper end of the slot 1b, i.e., the shutter blade 13 is caused to assume the illustrated open position. The light-transmitting element 104a remains in its first position in which it extends across the path of printing light. If the control circuit of the copying apparatus thereupon furnishes a signal to return the filter 103 to its first position and to move the filter 104 clockwise, as viewed in the drawing, the electromagnet 7 is deenergized whereby its spring pivots the armature 5 counterclockwise so that the holder 3 moves away from the pin 15. The spring 16 cannot contract because the electromagnet 8 is energized and the armature 6 pivots in a clockwise direction so that the holder 4 bears against the pin 15 and maintains the shutter blade 13 in open position. Signals furnished by the control circuit depend on a predetermined program or on the characteristics of the original whose image is to be reproduced on printing paper or the like.

The shutter blade 13 remains in open position when the control circuit produces a signal which causes energization of both electromagnets; the pin 15 is then held in the illustrated position by the holders 3 and 4. This will happen if the nature of the copying operation requires exposure of photosensitive material to printing light which should not pass through one or more color filters. As soon as the electromagnets 7 and 8 are deenergized, their springs pivot the armatures 5 and 6 in a counterclockwise direction and the holders 3, 4 permit the spring 16 to contract and to move the shutter blade 13 into registry with the opening 1a.

It is clear that the pin 15 can be employed to transmit motion to two or more shutter blades as well as that the apparatus may comprise three or even more filters. At the present time, we prefer to employ our apparatus in repro cameras of the type wherein the photosensitive material is exposed first to light which passes through a first filter and thereupon to light which passes through a second filter.

An important advantage of our apparatus is that its electric circuit is simpler than the circuits of copying apparatus wherein the shutter blade or blades are moved by a separate electromagnet which is energized only when all of the filters dwell in their operative positions, i.e., in positions in which they register with the light-admitting opening of the shutter. This brings about savings in initial cost and current consumption and reduces the likelihood of malfunction.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended

1. In a photographic apparatus, particularly in a photographic copying apparatus wherein photosensitive material is exposed to printing light passing through a plurality of color filters, a combination comprising a shutter defining a light-admitting opening and including blade means normally assuming a closed position and movable to an open position to thereby permit light to pass through said opening; a plurality of filters each movable independently between first and second positions in which the corresponding filter respectively registers with and is out of registry with said opening; drive means for moving said filters between first and second positions independently of each other; and displacing means for moving said blade means to open position in response to movement of at least one of said filters to second position.

2. A combination as defined in claim 1, wherein said drive means comprises a discrete electromagnet for each of said filters.

3. A combination as defined in claim 1, wherein said displacing means comprises a motion receiving portion provided on said blade means and a motion transmitting portion provided on each of said filters, each said motion transmitting portion being arranged to engage and to displace said motion receiving portion in response to movement of the respective filter to second position.

4. A combination as defined in claim 1, wherein said drive means comprises a discrete electromagnet for each of said filters, said electromagnets being energizable to thereby move the respective filters to second positions.

5. A combination as defined in claim 1, wherein said shutter further comprises biasing means for urging said blade means to closed position.

6. A combination as defined in claim 1, wherein said filters include a yellow filter and a blue filter.

7. A combination as defined in claim 1, further comprising a housing for said shutter, said filters, said drive means and said displacing means, said housing having apertures in registry with said opening.

8. In a photographic apparatus, particularly in a photographic copying apparatus wherein photosensitive material is exposed to printing light passing through a plurality of color filters, a combination comprising a shutter defining a light-admitting opening and including blade means normally assuming a closed position and movable to an open position to thereby permit light to pass through said opening; a plurality of filters each movable between first and second positions in which the corresponding filter respectively registers with and is out of registry with said opening; drive means for moving said filters between said first and second positions; and displacing means for moving said blade means to said open position in response to movement of at least one of said filters to said second position, said displacing means comprising a motion receiving pin provided on said blade means and a motion transmitting portion provided on each of said filters, each said motion transmitting portion being arranged to engage and to displace said motion receiving pin in response to movement of the respective filter to said second position, each of said filters comprising a light-transmitting element and a holder for such light-transmitting element, said holders constituting said motion transmitting portions.

9. In a photographic apparatus, particularly in a photographic copying apparatus wherein photosensitive material is exposed to printing light passing through a plurality of color filters, a combination comprising a shutter defining a light-admitting opening and including blade means normally assuming a closed position and pivotable to an open position about a predetermined axis to thereby permit light to pass through said opening; a plurality of filters each pivotable about said predetermined axis between first and second positions in which the corresponding filter respectively registers with and is out of registry with said opening; drive means for moving said filters between said first and second positions; and displacing means for moving said blade means to said open position in response to movement of at least one of said filters to said second position.

10. In a photographic apparatus, particularly in a photographic copying apparatus wherein photosensitive material is exposed to printing light passing through a plurality of color filters, a combination comprising a shutter defining a light-admitting opening and including blade means normally assuming a closed position and pivotable to an open position about a predetermined axis to thereby permit light to pass through said opening, and biasing means for urging said blade means to said closed position, said biasing means comprising a disk fixed to said blade means and having a peripheral groove and a helical spring having a fixed first end and a second end secured to said disk, said spring having a plurality of convolutions engaging said disk in said groove and being arranged to urge said blade means to said closed position; a plurality of filters each movable between first and second positions in which the corresponding filter respectively registers with and is out of registry with said opening; drive means for moving said filters between said first and second positions; and displacing means for moving said blade means to said open position in response to movement of at least one of said filters to said second position.

* * * * *